UNITED STATES PATENT OFFICE.

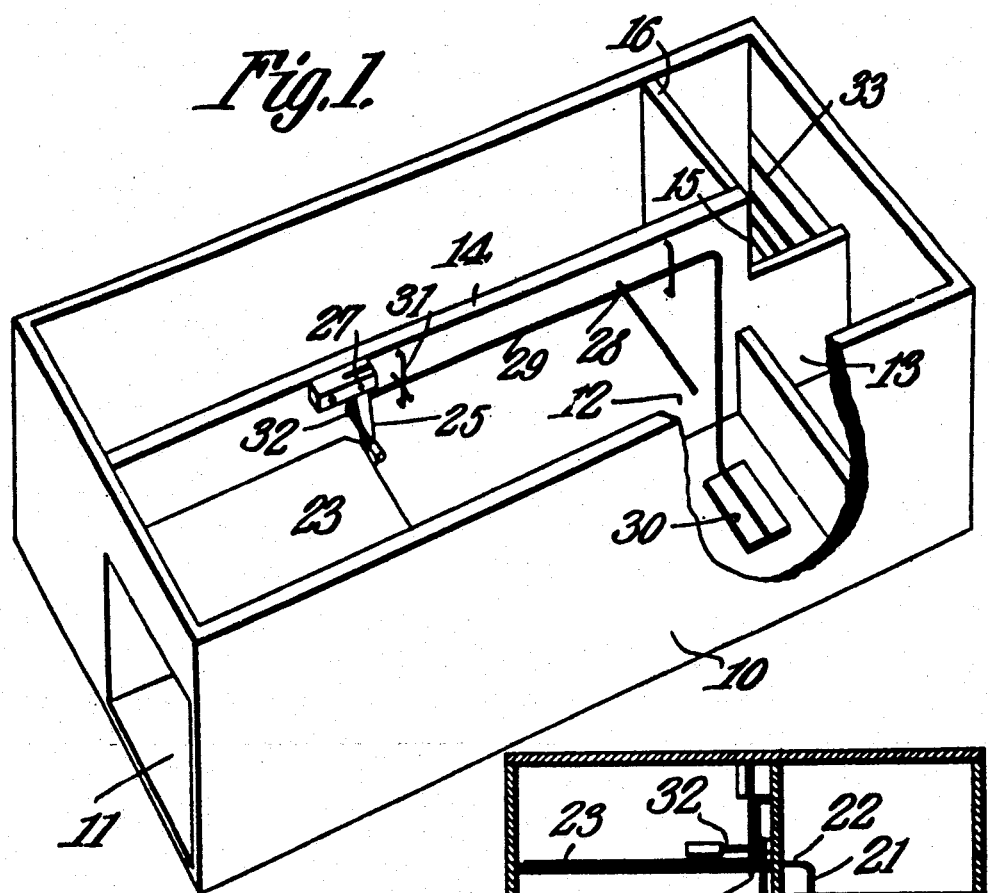
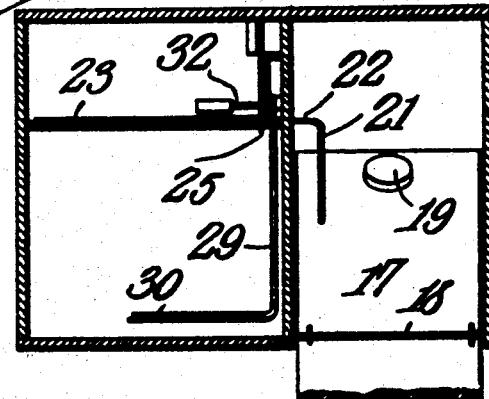

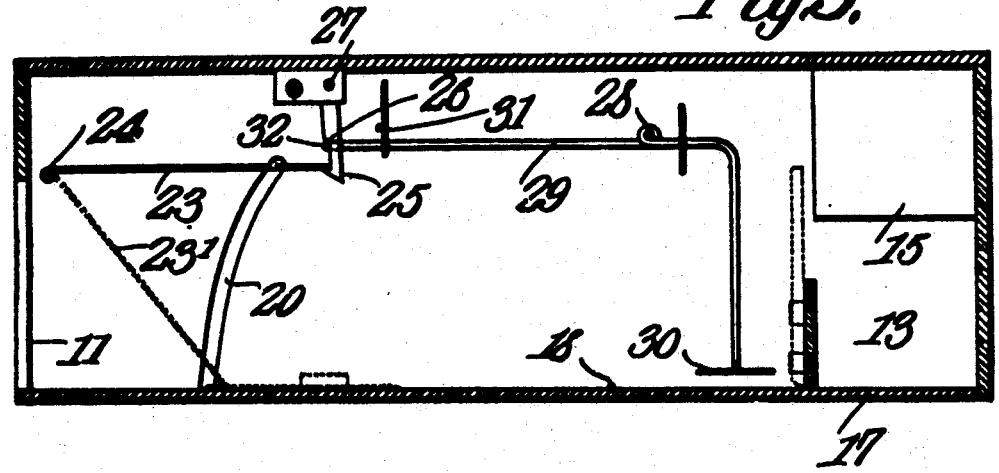
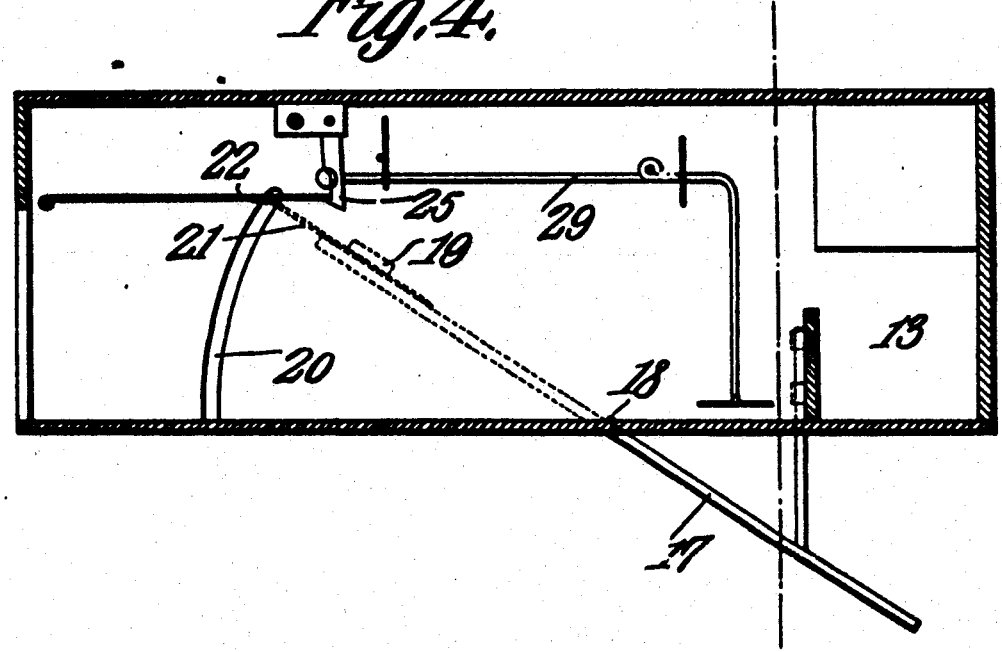

EDWIN S. LIPP, OF MYRTLE POINT, OREGON.

ANIMAL-TRAP.

No. 899,114.　　　Specification of Letters Patent.　　Patented Sept. 22, 1908.

Application filed April 11, 1908. Serial No. 426,512.

*To all whom it may concern:*

Be it known that I, EDWIN S. LIPP, a citizen of the United States, residing at Myrtle Point, in the county of Coos and State of Oregon, have invented a new and useful Animal-Trap, of which the following is a specification.

This invention relates to animal traps, and more especially to those designed to catch rats.

The object of the invention is to provide a trap wherein the entrance of the animal will by improved mechanism close a door behind him and cause him to attempt to escape to a chute and his passage through the chute will result in the resetting of said trap.

The invention comprises a trap of the character described especially arranged to be placed over a barrel or tub of water or the like, although it may be used in connection with a rearwardly disposed cage, or a cage arranged beneath the trap proper.

The invention further consists in certain novel features of construction and arrangement of parts, hereinafter fully described, illustrated in the accompanying drawings, and specifically claimed.

In the accompanying drawings:—Figure 1 is a perspective view of the device with the top removed and a portion of one side wall broken away. Fig. 2 is a cross section therethrough. Fig. 3 is a longitudinal section through the entrance passage, showing the trap in the set position. Fig. 4 is a similar view showing the manner in which the trap is set.

Similar numerals of reference are employed to indicate corresponding parts throughout the several figures of the drawings.

The numeral 10 indicates the body of the trap which may be made of wood or metal and may be made solid as here shown or consist of a wire body, as may be desired. On one end of the body 10 is formed an opening 11 communicating with the passage 12, which is termed the entrance passage. At the far end of the passage 12 is provided a bait box 13. One wall of the body serves to form one wall of this passage, and a partition 14 serves to form the opposite wall thereof. The partition 14 is cut away, as indicated at 15, and adjacent the cut away portion thereof is held a partition 16.

The portion of the body inclosed between the end and the side walls and the partitions 14 and 16 constitutes a downwardly extending chute, which is provided with a trap door 17, pivoted as at 18, and normally held to close the bottom of said chute by means of a counter-weight 19. In the partition 14 is formed an arched opening 20, and a wire 21 is held upon the trap door 17 to project through this opening, as indicated at 22.

Adjacent the opening 11 is mounted a door 23 preferably of tin or the like and solid, the door 23 being pivoted on a suitable hinge as at 24. It is to be noted that the door 23 takes the position when closed shown in the dotted lines at 23' in Fig. 3. Suitably positioned adjacent the path of the bottom edge of said door is a latch 25, provided with a cam surface 26, said latch being pivoted as at 27.

Mounted in the entrance passage upon a pivot 28 is a bent lever 29, at the lower end whereof is carried a treadle 30. The bent lever 29 extends through a suitable slot 31, and is provided with a portion 32 arranged to lie adjacent the latch 25 and contact with the cam surface 26 thereon. In the downwardly extending chute before mentioned is formed a barred window 33 for the purpose of admitting light therethrough.

In the operation of the device, the parts being arranged as shown in full lines in Fig. 3, the animal enters by the opening 11 and goes back toward the feed box 13. As he attempts to reach this box, he steps upon the treadle 30, which lifts the end 32 of the lever 29 against the cam surface 26 of the latch 25, thus causing said latch to withdraw from contact with the edge of the door, and permitting the door to assume the position shown in dotted lines at 23' in that figure. The noise of the door dropping behind the animal startles him and he naturally seeks means of escape from the now closed entrance passage. The cut-away portion of the partition 15 affords a ready means for his doing this, and he jumps through that partition hoping to escape through the barred window 33. As soon, however, as he strikes the bottom of the chute, the trap door 17 tilts up into the position indicated in Fig. 4, and the finger 22 raises the door again to operative position, as shown in that figure. The lever 29 having been released from the weight of the animal drops back, and permits the catch to pass under the edge of the door and secure the same in open position. Meanwhile, the animal has passed through the chute. The device as previously set forth may be used by placing the same on the top of a barrel or tub of water, or it may be manufactured, if preferred, with a cage located under the body portion above described, or any such other position, as to the rear of said portion, as may be deemed advisable.

It is to be noticed that there is here provided a simple and effective device of this character which consists of very few parts and those readily manufactured, the whole being free from complicated mechanisms.

It is obvious that minor changes may be made in the form and construction of this device, and it is desired to claim all such as properly come within the scope thereof.

What is claimed is:—

1. An animal trap comprising a body having an entrance passage therein and an outlet therefrom, a door in said entrance passage arranged to be open when said trap is set, a latch having a cam thereon to engage said door when open a trip to release said latch and permit the door to close, and means actuated by the passage of an animal through said outlet to open said door and reset said trap.

2. An animal trap comprising a body having an entrance passage therein and an outlet therefrom, a door in said entrance passage arranged to be open when said trap is set, a latch having a cam thereon to engage said door and retain the same in the open position, a lever to be operated by pressure thereon to engage said cam and withdraw said latch and release said door and means actuated by the passage of an animal through said outlet to open said door and reset said trap.

3. An animal trap comprising a body having a horizontal entrance passage and a vertical chute forming an outlet therefrom, a door in said entrance passage arranged to be open when said trap is set, a latch having a cam thereon to engage said door and retain the same in the open position, a treadle, a lever supporting said treadle provided with a finger to engage the cam on said latch and withdraw the latch from engagement with the door when said treadle is depressed, a trap door at the bottom of said chute, and means attached to said trap door to reset said entrance door.

In testimony that I claim the foregoing as my own, I have hereto affixed my signature in the presence of two witnesses.

EDWIN S. LIPP.

Witnesses:
L. E. ROBBINS,
W. H. WIGANT